US012276368B2

(12) United States Patent
MacFarlane

(10) Patent No.: US 12,276,368 B2
(45) Date of Patent: *Apr. 15, 2025

(54) GAS TURBINE ENGINE CASING ARRANGEMENT

(71) Applicant: PRATT & WHITNEY CANADA CORP., Longueuil (CA)

(72) Inventor: Ian A. MacFarlane, St-Bruno-de-Montarville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 596 days.

This patent is subject to a terminal disclaimer.

(21) Appl. No.: 17/479,279

(22) Filed: Sep. 20, 2021

(65) Prior Publication Data

US 2022/0003354 A1 Jan. 6, 2022

Related U.S. Application Data

(62) Division of application No. 15/584,336, filed on May 2, 2017, now Pat. No. 11,168,828.

(51) Int. Cl.
*F04B 53/14* (2006.01)
*F01D 25/24* (2006.01)
(Continued)

(52) U.S. Cl.
CPC ............. *F16M 1/04* (2013.01); *F01D 25/243* (2013.01); *F01D 25/265* (2013.01); *F01D 25/28* (2013.01); *F01D 25/24* (2013.01); *F05D 2220/30* (2013.01); *F05D 2220/32* (2013.01); *F05D 2230/70* (2013.01); *F05D 2230/72* (2013.01); *F05D 2260/02* (2013.01); *F05D 2260/4031* (2013.01)

(58) Field of Classification Search
CPC ........... F16M 1/04; F01D 25/14; F01D 25/16; F01D 25/24; F01D 25/243; F01D 25/265; F01D 25/28; F05D 2220/30; F05D 2220/32–327; F05D 2230/70; F05D 2230/72; F05D 2260/02; F05D 2260/4031
See application file for complete search history.

(56) References Cited

U.S. PATENT DOCUMENTS 3,152,443 A * 10/1964 Newland .................. F02C 3/10
60/791
3,488,947 A 1/1970 Miller
(Continued)

*Primary Examiner* — Essama Omgba
*Assistant Examiner* — Charles W Nichols
(74) *Attorney, Agent, or Firm* — NORTON ROSE FULBRIGHT CANADA LLP

(57) ABSTRACT

A gas turbine engine includes a casing including a plurality of interconnected casing segments defining an outer surface of the casing. One of the casing segments is a gearbox segment enclosing a gearbox and having a gearbox flange extending radially outwardly from the outer surface of the casing. The engine includes a bearing housing enclosing at least one bearing and having an annular body with an inner segment disposed within the casing. The annular body having an extension segment extending radially outwardly from the inner segment to a bearing housing flange disposed radially-outwardly of the outer surface of the casing. The bearing housing flange is engageable with the gearbox flange to removably mount the gearbox segment to the bearing housing.

8 Claims, 3 Drawing Sheets

(51) Int. Cl.
*F01D 25/26* (2006.01)
*F01D 25/28* (2006.01)
*F04B 53/16* (2006.01)
*F16M 1/04* (2006.01)

(56) References Cited

U.S. PATENT DOCUMENTS

| | | | | |
|---|---|---|---|---|
| 3,632,222 A | * | 1/1972 | Cronstedt | F02C 7/36 |
| | | | | 416/500 |
| 3,761,205 A | * | 9/1973 | Cronstedt | F02C 3/113 |
| | | | | 417/373 |
| 3,853,432 A | * | 12/1974 | Cronstedt | F02C 3/113 |
| | | | | 60/39.08 |
| 3,874,824 A | * | 4/1975 | Cronstedt | F01D 5/026 |
| | | | | 417/406 |
| 4,025,221 A | | 5/1977 | Kronogard | |
| 4,074,914 A | * | 2/1978 | Novotny | F16L 23/02 |
| | | | | 415/214.1 |
| 4,446,696 A | | 5/1984 | Sargisson et al. | |
| 4,685,286 A | | 8/1987 | Hetzer et al. | |
| 4,744,214 A | | 5/1988 | Monsarrat et al. | |
| 4,934,140 A | | 6/1990 | Dennison et al. | |
| 5,131,782 A | * | 7/1992 | Bruno | F16D 1/05 |
| | | | | 403/259 |
| 7,955,046 B2 | | 6/2011 | McCune et al. | |
| 8,350,398 B2 | | 1/2013 | Butt | |
| 8,366,385 B2 | | 2/2013 | Davis et al. | |
| 8,459,038 B1 | * | 6/2013 | Lickfold | F02K 3/025 |
| | | | | 60/773 |
| 9,890,704 B2 | | 3/2018 | Speak et al. | |
| 2016/0237857 A1 | | 8/2016 | Hanrahan et al. | |
| 2016/0298548 A1 | | 10/2016 | Brault et al. | |
| 2018/0023471 A1 | | 1/2018 | Lefebvre et al. | |
| 2018/0306053 A1 | * | 10/2018 | Chapman | B64C 11/06 |

\* cited by examiner

GAS TURBINE ENGINE CASING ARRANGEMENT

CROSS-REFERENCE TO RELATED APPLICATIONS

This application is a divisional of U.S. application Ser. No. 15/584,336 filed May 2, 2017, the entire content of which is incorporated by reference herein.

TECHNICAL FIELD

The application relates generally to gas turbine engines and, more particularly, to casing arrangements for such engines.

BACKGROUND

Gas turbine engines have inner core components that may need to be accessed for inspection or maintenance. The architecture of some gas turbine engines does not facilitate access to these inner core components.

SUMMARY

In one aspect, there is provided a gas turbine engine, comprising: a casing including a plurality of interconnected casing segments defining an outer surface of the casing, one of the casing segments being a gearbox segment enclosing a gearbox and having a gearbox flange extending radially outwardly from the outer surface of the casing; and a bearing housing enclosing at least one bearing and having an annular body with an inner segment disposed within the casing, the annular body having an extension segment extending radially outwardly from the inner segment to a bearing housing flange disposed radially-outwardly of the outer surface of the casing, the bearing housing flange being engageable with the gearbox flange to removably mount the gearbox segment to the bearing housing.

In another aspect, there is provided a method of accessing an interior of a gas turbine engine having a casing including a plurality of interconnected casing segments, the method comprising: decoupling a gearbox casing segment having a gearbox from a bearing housing by decoupling mating flanges of the gearbox casing segment and the bearing housing, the mating flanges extending radially outwardly from the casing; and removing the gearbox casing segment and the gearbox to access the interior of the engine.

In a further aspect, there is provided a method of assembling a gas turbine engine, comprising: forming a casing of the gas turbine engine from a plurality of casing segments, including mounting a gearbox casing segment to a bearing housing to position the bearing housing substantially within the casing, the gearbox casing segment being mounted to the bearing housing by attaching mating flanges of the gearbox casing segment and the bearing housing, the mating flanges extending radially outwardly from the casing.

DESCRIPTION OF THE DRAWINGS

Reference is now made to the accompanying figures in which.

DETAILED DESCRIPTION

Figure 1:
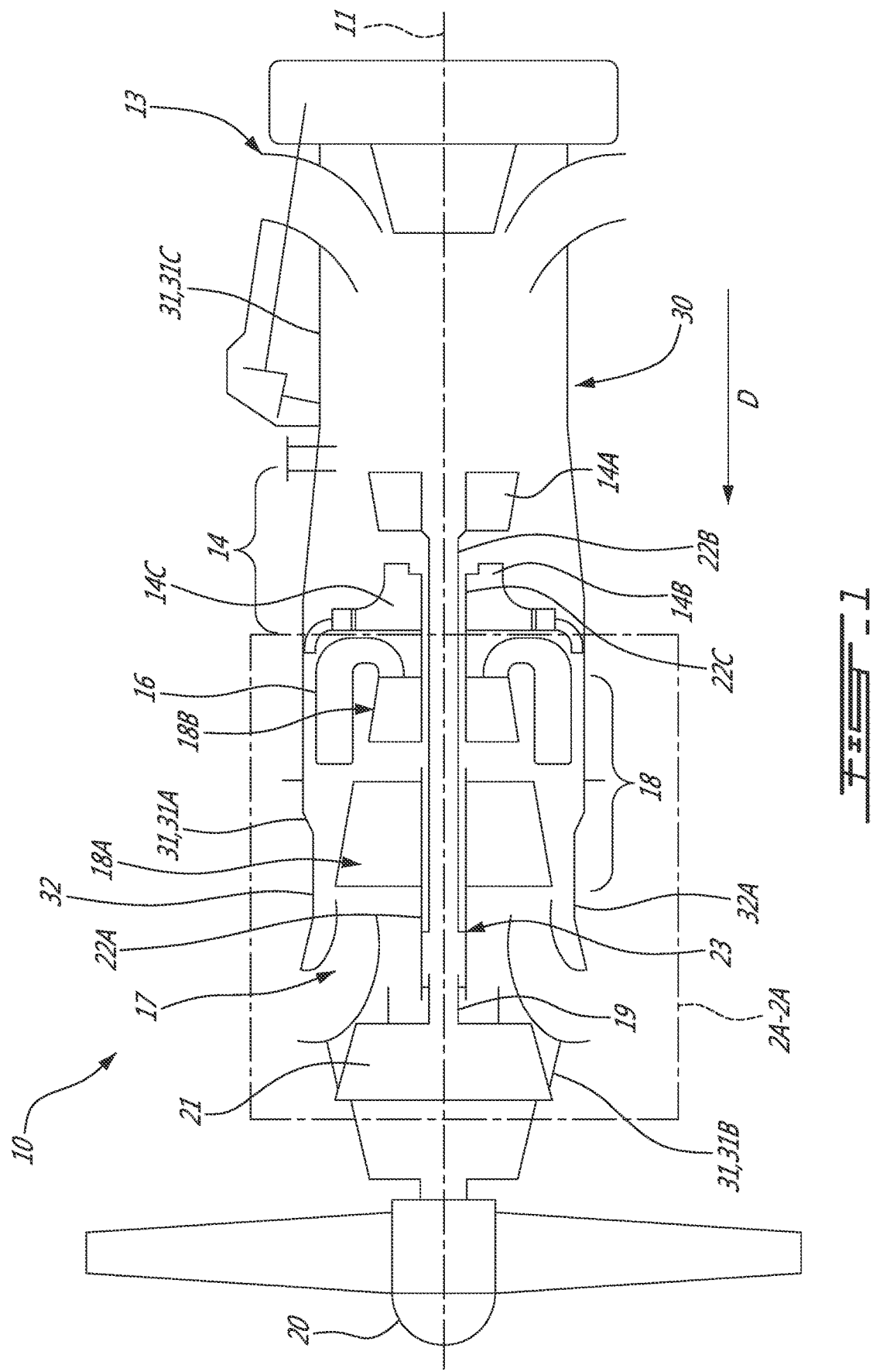
FIG. 1 is a schematic cross-sectional view of a gas turbine engine.

FIG. 1 illustrates a turboprop gas turbine engine 10 of a type preferably provided for use in subsonic flight, generally comprising in serial flow communication an air intake or inlet 13 through which air is drawn, a compressor section 14 for pressurizing the air, a combustor 16 in which the compressed air is mixed with fuel and ignited for generating an annular stream of hot combustion gases, and a turbine section 18 for extracting energy from the combustion gases. One or more turbine(s) of the turbines section 18 transmit a driving force to an input shaft 19 coupled to a propeller 20 via a reduction gearbox generally shown at 21. The turbomachinery of the gas turbine engine 10 rotates about a longitudinal center axis 11.

The exemplified engine 10 of FIG. 1 is a "reverse-flow" engine 10 because gases flow through the core from the air inlet 13 at a rear portion thereof, to an exhaust outlet 17 at a front portion thereof. This is in contrast to "through-flow" gas turbine engines in which gases flow through the core of the engine 10 from a front portion to a rear portion. The direction of the flow of gases through the engine 10 can be better appreciated by considering that the gases flow in the same direction D as the one along which the engine 10 travels during flight. Stated differently, gases flow through the engine 10 from a rear end thereof towards the propeller 20. In alternate embodiments, the engine 10 is a "through-flow" engine 10 where gases flow through the engine 10 from a front end in a direction opposite to the direction D away from the propeller 20.

It will thus be appreciated that the expressions "forward" and "aft" used herein refer to the relative disposition of components of the engine 10, in correspondence to the "forward" and "aft" directions of the engine 10 and an aircraft including the engine 10 as defined with respect to the direction of travel. In the embodiment shown, a component of the engine 10 that is "forward" of another component is arranged within the engine 10 such that it is located closer to the propeller 20. Similarly, a component of the engine 10 that is "aft" of another component is arranged within the engine 10 such that it is further away from the propeller 20.

Still referring to FIG. 1, the engine 10 has a casing 30. The casing 30 houses components of the turbomachinery of the engine 10 and provides structure thereto. The casing 30 in FIG. 1 includes multiple casing segments 31. Each casing segment 31 is an annular body for enclosing components of the engine 10. The casing segments 31 are interconnected to form an axially-extending casing body. In FIG. 1, one of the casing segments 31 is a "hot section" or turbine casing segment 31A which houses the components of the turbine section 18. Another casing segment 31 includes a gearbox casing segment 31B which houses the reduction gearbox 21. Yet another casing segment 31 includes a "cold" section or compressor casing segment 31C which houses the components of the compressor section 14. When connected together, the casing segments 31 define an outer surface 32 of the casing 30. In the depicted embodiment, the outer surface 32 is a circumferential surface that extends along the axis 11. In FIG. 1, the outer surface 32 is shown exposed. The outer surface 32 can therefore be easily accessed by a technician when performing inspection, maintenance, or repairs of the engine 10. In the depicted embodiment, the outer surface 32 forms the outermost surface 32A of the engine 10. The outermost surface 32A of the engine 10 is free of obstructions that would prevent or impede the technician from accessing the outermost surface 32A. In an alternate embodiment, the outer surface 32 is covered by another duct, housing or nacelle of the engine 10, and is still easily accessible.

Still referring to FIG. 1, the engine 10 has multiple spools disposed within the casing 30 which perform compression to pressurize the air received through the air inlet 13, and which extract energy from the combustion gases before they exit via the exhaust outlet 17. It is understood that the term "spool" as used herein is intended to broadly refer to drivingly connected turbine and compressor rotors and is, thus, not limited to a compressor and turbine assembly on a single shaft, and includes for example a rotary assembly with multiple shafts geared together.

A "low pressure" or "LP" spool includes at least one component to extract energy from the combustion gases that is part of the turbine section 18. The LP spool has a LP turbine 18A which extracts energy from the combustion gases. The LP turbine 18A (also referred to as the power turbine or "PT") drives an axially-extending engine output shaft 22A. The output shaft 22A is also disposed within the casing 30 and supporting by suitable bearings and struts. The output shaft 22A transfers the rotational output of the LP turbine 18A to drive another component. In the depicted embodiment, the output shaft 22A drives at least the input shaft 19 of the gearbox 21. The output shaft 22A is coaxial with the central axis 11 of the engine 10. The output shaft 22A is not limited to the configuration depicted in FIG. 1, and can also mechanically couple to the LP turbine 18A in any other suitable way provided that a rotational drive is transmitted from the LP turbine 18A to the output shaft 22A. In the depicted embodiment, the LP turbine 18A is an axial rotatable component having an axis of rotation that is coaxial with the center axis 11. The LP turbine 18A can include one or more stages, depending upon the desired engine thermodynamic cycle, for example.

In the depicted embodiment, the LP spool also includes at least one component to compress the air that is part of the compressor section 14. The output shaft 22A of the LP turbine 18A is coupled to an LP shaft 22B at a shaft coupling 23 to be driven by the output shaft 22A. The LP shaft 22B is also disposed within the casing 30, and is coaxial with the central axis 11. The LP shaft 22B extends in an aft direction from the shaft coupling 23 to be mechanically coupled to an LP compressor 14A disposed aft of the shaft coupling 23. The LP shaft 22B transfers the rotational output it receives from the output shaft 22A to the LP compressor 14A. The LP compressor 14A provides additional compression to the air entering the engine 10 and is thus also referred to as a "boost" compressor 14A. In FIG. 1, the shaft coupling 23 is shown as having a power turbine (PT) shaft nut which mechanically couples the output shaft 22A to the LP shaft 22B. The PT shaft nut of the shaft coupling 23 therefore links the boost of the LP compressor 14A to the PT output of the LP turbine 18A. Other configurations for coupling the output shaft 22A to the LP shaft 22B at the shaft coupling 23 are possible. For example, in an alternate embodiment, the shaft coupling 23 includes a spline allowing for the transfer of torque between the output shaft 22A and the LP shaft 22B.

In the illustrated embodiment, the output shaft 22A is distinct from the LP shaft 22B and mechanically coupled thereto. Other mechanical techniques can also be used to interconnect the output and LP shafts 22A,22B. For example, the output and LP shafts 22A,22B can be interconnected by curvic coupling, pins, and interference fits. Other configurations of the output shaft 22A and the LP shaft 22B are also possible. For example, the output shaft 22A and the LP shaft 22B can be a single shaft driven by the LP turbine 18A.

Still referring to FIG. 1, a "high pressure" or "HP" spool has at least one component to compress the air that is part of the compressor section 14, and at least one component to extract energy from the combustion gases that is part of the turbine section 18. The components of the HP spool are also disposed along the axis 11 and include an HP turbine 18B drivingly engaged to an HP compressor 14B by an HP shaft 22C rotating independently of the LP shaft 22B and the output shaft 22A, for example by having rotors of the HP turbine 18B and HP compressor 14B directly connected to the HP shaft 22C. Similarly to the LP turbine 18A, the HP turbine 18B and the HP compressor 14B can include various stages of axial rotary components. In the depicted embodiment, the HP compressor 14B includes a centrifugal compressor 14C or impeller which is driven by the HP turbine 18B. During operation of the engine 10, the HP turbine 18B drives the HP compressor 14B.

Figure 2A:
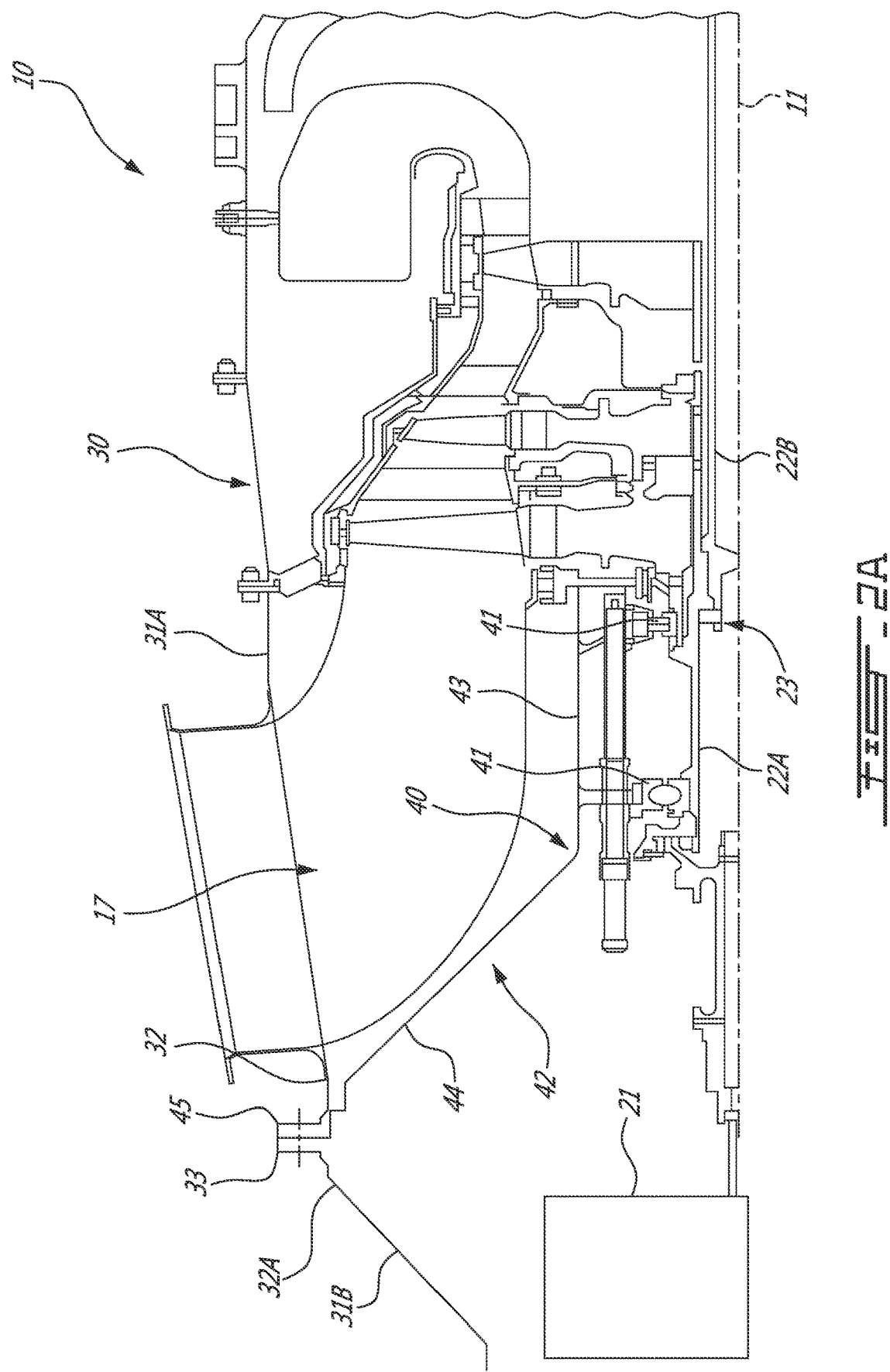
FIG. 2A is a cross-sectional view of the highlighted portion of FIG. 1, showing a gearbox casing segment and a bearing housing of the gas turbine engine.

FIG. 2A shows a portion of the engine 10. The casing segments 31 of the casing 30 shown in FIG. 2A include the turbine and gearbox casing segments 31A,31B. The engine 10 has a bearing housing 40 most of which is disposed within the casing 30. In the depicted embodiment, the bearing housing 40 is disposed within the turbine casing segment 31A of the casing 30. The bearing housing 40 encloses one or more bearings 41, and is supported within the engine 10 by suitable struts or other structural supports. In the depicted embodiment, the bearing housing 41 houses two bearings 41, each of which engages and supports the output shaft 22A. The bearings 41 may also indirectly support the LP shaft 22B.

The bearing housing 40 includes an annular body 42 with an axial length. The annular body 42 is coaxial with the center axis 11. The annular body 42 includes an inner segment 43 and an extension segment 44. The inner segment 43 is an annular segment of the annular body 42 that is disposed entirely within the casing 30. In FIG. 2A, the inner segment 43 is disposed entirely within the turbine casing segment 31A. The inner segment 43 extends along a substantially axial direction, and has an axial length. In the depicted embodiment, the inner segment 43 extends axially in a direction that is substantially parallel to the center axis 11.

The extension segment 44 is another annular segment of the annular body 42 that is disposed substantially within the casing 30. In FIG. 2A, the extension segment 44 is disposed almost entirely within the turbine casing segment 31A. The extension segment 44 is an extension of the inner segment 43. The extension segment 44 extends radially outwardly away from the inner segment 43. In FIG. 2A, the extension segment 44 extends at an angle to the center axis 11, and therefore has an axial directional component (i.e. parallel to the center axis 11) and a radial directional component (i.e. parallel to a radial line of the engine 10). Therefore, in the depicted embodiment, the annular body 42 of the bearing housing 40 has a substantially flared or conic cross-sectional shape. Other shapes for the annular body 42 are possible. The extension segment 44 terminates at a radially-outer bearing housing flange 45. The bearing housing flange 45 is a projecting rim, collar, or rib used to mount the bearing housing 40 to another component of the engine 10. In the depicted embodiment, the bearing housing flange 45 is located radially outwardly of the outer surface 32 of the casing 30. By being disposed at a radially-outer location, the bearing housing flange 45 is accessible by the technician for inspection, or to decouple the bearing housing 40 from another component of the engine 10.

In the depicted embodiment, the gearbox casing segment 31B has a gearbox flange 33 that extends radially outwardly from the outer surface 32 of the casing 30. The gearbox flange 33 is any suitable rim, collar, or rib that projects radially outwardly away from the outer surface 32, and which is used to mount the gearbox casing segment 31B to another component of the engine 10. In FIG. 2A, the gearbox casing segment 31B is mounted to the bearing housing 40 via the gearbox and bearing housing flanges 33,45. The gearbox and bearing housing flanges 33,45 are therefore mating flanges that are secured together with a suitable mechanical fastener to removably mount the gearbox casing segment 31B to the bearing housing 40. The bearing housing 40 is therefore mounted at a radial outer part of the engine 10 to the gearbox casing segment 31B. In the embodiment of FIG. 2A, the gearbox and bearing housing flanges 33,45 are disposed along the radially-outermost surface 32A of the engine 10 to be more readily accessible. The mating gearbox and bearing housing flanges 33,45 are disposed on an outer portion of the engine casing 30 to be accessible by the technician. The extension segment 44 therefore extends the bearing housing 40 such that its bearing housing flange 45 is made accessible on an outer portion of the engine 10, and is brought closer to the gearbox casing segment 31B, when compared to some conventional engine architectures.

Figure 2B:
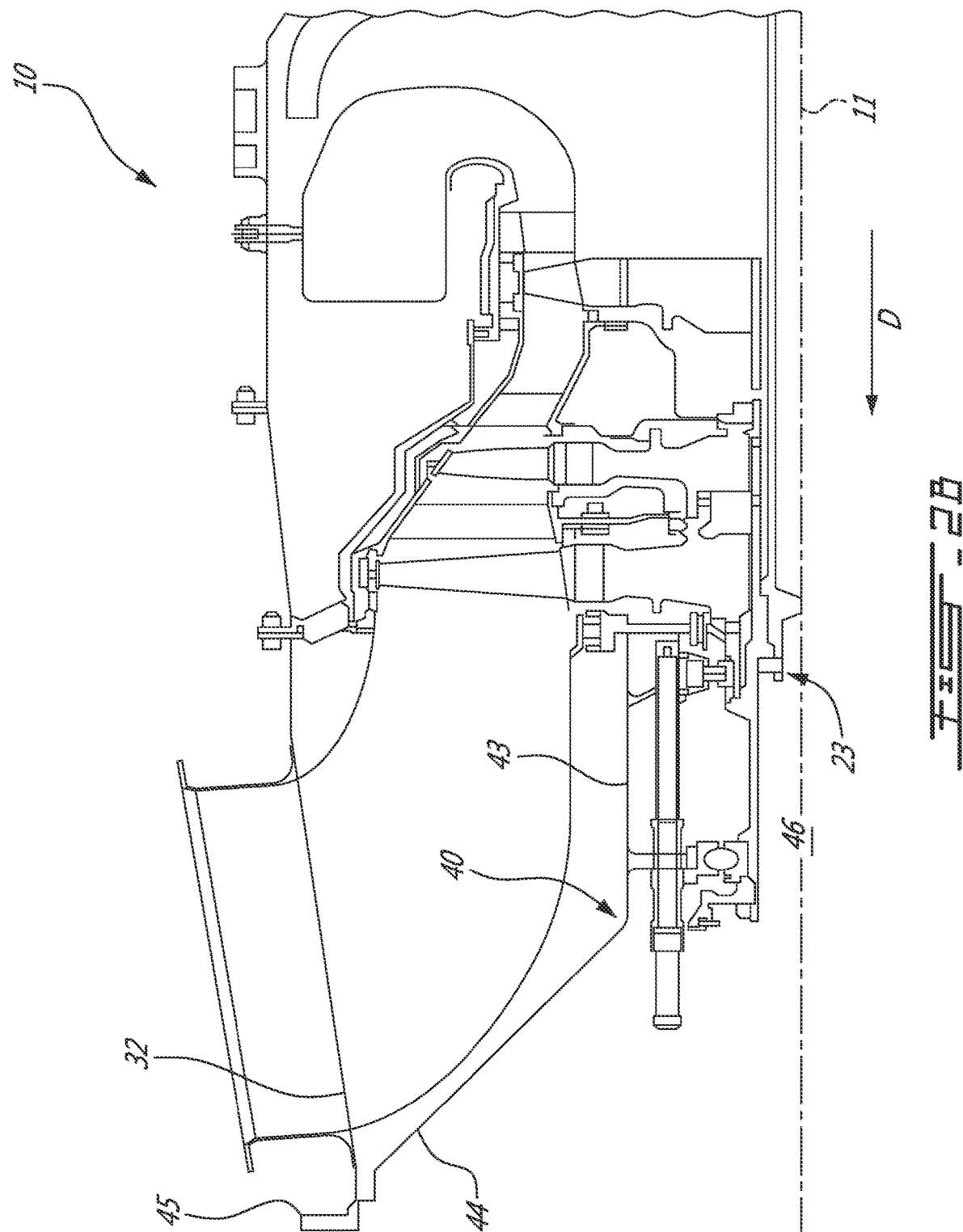
FIG. 2B is a cross-sectional view of the highlighted portion of FIG. 1, shown without the gearbox casing segment and the gearbox.

The positioning of the bearing housing flange 45 along an outer portion of the casing 30 facilitates the removal of components mounted to the bearing housing 40. More particularly, the location of the bearing housing flange 45 allows the gearbox casing segment 31B to be easily decoupled from the bearing housing 40 by decoupling the gearbox flange 33 from the bearing housing flange 45. Indeed, this is what is shown in FIG. 2B, where the gearbox casing segment 31B and the gearbox 21 have been removed. An access path 46 is defined through the engine 10 when the mating flanges 33,45 are disengaged, and the gearbox casing segment 31B and the gearbox 21 are removed. The access path 46 is an elongated void or space extending within the engine 10 that is relatively unobstructed, and which allows the technician to access components in the interior of the engine 10. In the embodiment of FIG. 2B, the access path 46 is at least partially enclosed by the bearing housing 40. The inner segment 43 of the bearing housing 40 circumscribes at least part of the access path 46, and the shaft coupling 23. The access path 46 extends within the casing 30 to permit access to the shaft coupling 23.

The positioning of the bearing housing flange 45 along an outer portion of the casing 30 facilitates the removal of the gearbox casing segment 31B, and thus provides relatively easy access via the access path 46 to the PT shaft nut of the shaft coupling 23. Therefore, in order for the technician to access the shaft coupling 23 for inspection or repair, the technician simply has to detach the extended bearing housing 40 from the gearbox casing segment 31B at an accessible outer portion of the casing 30. This allows for a quick removal of the gearbox casing segment 31B and/or gearbox 21, which creates the access path 46 to more easily access the PT shaft nut. The extended bearing housing 40 therefore helps reduce the distance to access the PT shaft nut, and may improve maintenance times and reduce the difficulty of performing repairs or inspections. This makes it possible, at least for the engine architecture shown in FIGS. 2A and 2B, to access the PT shaft nut without a complete engine overhaul. In FIG. 2B, the access path 46 extends from the shaft coupling 23 in a forward direction. The interior of the casing 30 and the shaft coupling 23 are therefore accessible by the technician from a front of the engine 10.

The positioning of the bearing housing flange 45 along an outer portion of the casing 30 also facilitates the modular removal of components of the engine 10. More particularly, the location of the bearing housing flange 45 along an outer portion of the casing 30 allows the gearbox casing segment 31B to be easily decoupled from the bearing housing 40 by decoupling the gearbox flange 33 from the bearing housing flange 45, without affecting the bearing housing 40. Indeed, this is what is shown in FIG. 2B, where the gearbox casing segment 31B and the gearbox 21 have been removed but the bearing housing 40 remains in place. The gearbox casing segment 31B and the gearbox 21 are therefore removable from the engine without displacing the bearing housing 40. This allows the gearbox casing segment 31B to be removed as a separate module without having to move the bearing housing 40. In an embodiment of the engine 10 that includes the propeller 20, as shown in FIG. 1, the gearbox casing segment 31B, which is axially positioned between the propeller 20 and the bearing housing 40, can be removed from the engine 10 without displacing the propeller 20 or the bearing housing 40. This allows maintaining the propeller 20 in place when performing "hot section inspections" (HSI) or "hot section repairs" (HSR), which are actions performed on the components of the turbine section 18. In another modular configuration, in an embodiment of the engine 10 where it is mounted to a wing of an aircraft, the gearbox casing segment 31B and the gearbox 21 can be removed while the engine 10 remains mounted to the wing. This allows for on-wing repairs and inspections of the turbine section 18 of the engine 10.

Referring to FIGS. 2A and 2B, there is disclosed a method of accessing an interior of the engine 10. The method includes decoupling the gearbox casing segment 31B from the bearing housing 40 by decoupling the mating flanges 33,45. The mating flanges 33,45 extend radially outwardly from the casing 30. The method includes removing the gearbox casing segment 31B and the gearbox 21 to access the interior of the engine 10.

There is disclosed a method of assembling the engine 10. The method includes forming the casing 30 from a plurality of casing segments 31, including mounting a gearbox casing segment 31B to a bearing housing 40 to position the bearing housing 40 substantially within the casing 30. The gearbox casing segment 31B is mounted to the bearing housing 40 by attaching the mating flanges 33,45, and the mating flanges 33,45 extend radially outwardly from the casing 30.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A method of accessing an interior of a reverse flow turboprop engine having a low pressure (LP) spool and a high pressure (HP) spool housed in a casing including a plurality of interconnected casing segments, the LP spool including a LP turbine having an output shaft drivingly connected to both a LP shaft of a LP compressor and to a propeller via a gearbox, the LP turbine disposed forward of the LP compressor, the gearbox disposed axially between the propeller and a shaft coupling between the output shaft of the LP turbine and the LP shaft of the LP compressor, the method comprising:

decoupling a gearbox casing segment of the gearbox from a bearing housing of a bearing supporting the output shaft of the LP turbine, including decoupling mating flanges of the gearbox casing segment and the bearing housing, the bearing housing mounted within a turbine casing segment housing the LP turbine;

removing the gearbox casing segment and the gearbox to access the shaft coupling between the output shaft of the LP turbine and the LP shaft of the LP compressor; and accessing the shaft coupling axially from a front end of the reverse flow turboprop engine via an access path extending axially through the bearing housing and the output shaft, the LP shaft of the LP compressor projecting from a first location aft of the LP turbine to a second location forward of the LP turbine inside the bearing housing where the shaft coupling is located.

2. The method as defined in claim 1, wherein decoupling the gearbox casing segment includes decoupling the mating flanges of the gearbox casing segment and the bearing housing, the mating flanges extending radially outwardly from the casing at a location axially adjacent to an exhaust outlet of the reverse flow turboprop engine.

3. The method as defined in claim 1, wherein removing the gearbox casing segment and the gearbox includes removing the gearbox casing segment and the gearbox while maintaining the bearing housing mounted within the turbine casing segment.

4. The method as defined in claim 1, wherein removing the gearbox casing segment and the gearbox includes removing the gearbox casing segment and the gearbox from between the propeller of the reverse flow turboprop engine and the bearing housing, the propeller remaining attached to the gearbox and being detached from the bearing housing with the gearbox.

5. The method as defined in claim 1, wherein removing the gearbox casing segment and the gearbox includes removing the gearbox casing segment and the gearbox while the reverse flow turboprop engine remains mounted to a wing of an aircraft.

6. The method as defined in claim 1, wherein the mating flanges of the gearbox casing segment and the bearing housing extend radially outwardly from the casing.

7. The method as defined in claim 1, wherein the shaft coupling has a power turbine (PT) shaft nut which mechanically couples the output shaft to the LP shaft, the power turbine shaft nut disposed radially inwardly of the bearing housing, and wherein the method further comprises accessing the power turbine shaft axially centrally through the bearing housing.

8. The method as defined in claim 1, wherein the mating flanges are disposed on an outermost radial portion the reverse flow turboprop engine.

* * * * *